PARTY LINE KEYING CIRCUIT

Filed May 11, 1959 2 Sheets-Sheet 1

Inventors:
George L. King
+ Henry H. Emker
By Rudolph J. Jurick
Attorney

Inventors
George L. King
Henry H. Emker
By Rudolph J. Jurick
Attorney

United States Patent Office 2,997,534
Patented Aug. 22, 1961

2,997,534
PARTY LINE KEYING CIRCUIT

George L. King, Morris Plains, and Henry H. Emker, Pompton Plains, N.J., assignors to Radio Frequency Laboratories, Inc., Boonton, N.J., a corporation of New Jersey Filed May 11, 1959, Ser. No. 812,418
11 Claims. (Cl. 178—2)

This invention relates to a teleprinter system of the frequency shift type and more particularly to a party line keying circuit arrangement for use therein whereby such frequency shift type system is made adaptable for party line use.

In teleprinter systems of the type to which this invention is directed, the various characters, figures, punctuation marks, etc., are represented by a succession of wave pulses having a precise time duration, all in accordance with a radiotype code. The time duration of each wave pulse and the spacing therebetween are of the order of milliseconds, and it is common practice to designate one current pulse as a Mark signal and the other a Space signal. The signals are generated by telegraph transmitters and transmitted over any desired communication link, such as, telephone lines, microwave links, power line carrier systems, or the like, to receiving printers. The coded Mark and Space signals are distinguished at the receiver printer, such that generally only the Mark signals are effective to cause operation of the printer selector magnet mechanism and bring about the power operation of the type bar corresponding to the particular received code character.

Any one of a various number of methods for designating the Mark and Space conditions may be used in teleprinter systems. In amplitude modulation methods, such as on-off keying systems, the transmitter normally sends a current of fixed value and sign to the line during a Mark period and zero current during a Space period (although these conditions may be reversed, if desired). In a party-line system (wherein a plurality of stations, each station comprising transmitter and receiver terminals and a teleprinter, are interconnected through a suitable two wire connecting link, for example) it is possible for all stations to receive the information sent by any one station when the above on-off system is employed. Also, it is possible for any one of the receiving stations to "break" the message being typed on the sending printer when necessary or desired. If a carrier frequency connecting link is used between stations, all the transmitters are tuned to a single carrier frequency, and all receivers are made responsive to the frequency. To function, it is required that the carrier signal be on the system only during the time that a station is transmitting information, and that at all other times there be no carrier present, and all printers be in a Mark-Hold or standby condition. This is simply accomplished in an on-off carrier system by using the carrier-off condition as Mark and the carrier-on condition as Space.

In frequency shift systems, a carrier is shifted to a frequency above its center-band frequency for a Mark function and to a frequency below center for a Space function. For a two station system, one carrier frequency channel may be used for each direction of communication wherein different transmitting tones are transmitted in each direction with the input of each equipment filtered to accept only the tones originating at the remote transmitting printer and to reject tones of its own local transmitter. By the use of suitable circuit arrangements, the above-mentioned desirable operational feature of being able to "break" the message being typed on the sending printer is obtained.

It will be readily apparent, however, that a party line arrangement employing frequency shift type equipment wherein each station transmitter and receiver is tuned to the same carrier frequency channel would be inoperative if each transmitter within the system transmitted to the connecting link a carrier frequency for the Mark-Hold or stand-by condition, since the transmission of a Space signal by any of the transmitter terminals would be overridden by the other Mark-Hold signals on the line, or connecting link. By use of the party line keying circuit of our invention at each station, party line facilities in a frequency-shift type system are possible.

Briefly, with the use of our novel keying circuit, no carrier signal is transmitted by any of the stations and all printers are maintained in a Mark-Hold condition due to receiver discriminator action, during stand-by. When the key board of any one printer is actuated, the frequency shifted carrier is transmitted to all other stations and operates the printers thereof. Carrier transmission is made to cease a short time interval after operation of the sending printer key board is discontinued.

The novel party line keying circuit of our invention is suited for use in either half duplex or full duplex teleprinter systems, and in both systems the circuit functions to place the transmitter carrier on the line at the start of the first pulse from the printer D.-C. loop, and to remove the carrier from the line at the end of a time interval after the last character has been typed. When used in a half-duplex arrangement, the party line circuit also functions to mute the receiver during the time the local transmitter is on the line. This muting function is necessary in a half-duplex (e.g. two-wire) system since all of the transmitters and receivers are tuned to the same carrier frequency and each receiver is vulnerable to its local transmitter in the sense that if the receiver provides an output upon energization of its transmitter, it will disrupt local teleprinter copy. Disruption of the local copy results from the fact that each station includes a D.-C. loop circiut comprising both receiving and transmitting contacts in series which cannot operate synchronously due to time delay in the transmission of the transmitted signal to the local receiver around the carrier loop. For this reason, the receiver is muted, by maintaining the receiver output relay contacts in closed condition, during transmission by the local transmitter; the receiver relay being responsive at all other times to the remote transmitters. It will be apparent that with the receiver muted, the receiving printer, or printers, cannot "break" the sending printer copy.

In the full-duplex system, wherein the carrier signal communication link is maintained on a four-wire basis, such as a micro-wave system, the input of the carrier receiver and the output of the carrier transmitter are isolated from each other. Therefore, the individual receiver is not vulnerable to its adjacent transmitter, and muting of the receiving relay is unnecessary. Since all of the teleprinters, including the one which is used for sending, are responsive at all times only to the remote transmitters, the four-wire application permits the use of the "break" feature.

It will be understood, then, that party-line operation of the teleprinters of the frequency shift carrier type with our novel keying circuit involves two principles of carrier modulation, frequency shift and amplitude modulation. When all of the printers are in a stand-by condition, no carrier signal is present on the communication circuit. A space frequency pulse is first applied to the circuit upon closure of any one of the teleprinter keying contacts, and since this represents a transition from no-carrier frequency to a carrier-on condition, it is amplitude modulation of the carrier. All succeeding Mark-Space transitions in the first transmitted character, as well as those following in the continuity of the printed message are on a frequency shift basis since the carrier is shifted in frequency for transmission of the Mark-Space coding.

An object of this invention is the provision of a keying circuit for use in a teleprinter system of the frequency shift type, which keying circuit serves to place the carrier on the communication line upon initial actuation of the printer key board and to remove the carrier from the line a short time after operation of the said sending printer key board is discontinued.

An object of this invention is the provision of a novel party line teleprinter system which operates on a combination of frequency shift modulation and amplitude modulation, the carrier frequency energy being cut off during stand-by periods of the printers.

An object of this invention is the provision of a novel receiver muting circuit for use in a teleprinter system, which circuit serves to maintain the receiver relay contacts in closed condition during the transmitting operation of the local transmitter.

An object of this invention is the provision of a party line teleprinter system which includes a circuit for muting the receiver while the local transmitter terminal is energizing the communication line.

An object of this invention is the provision of a novel party line circuit which functions to place the transmitter carrier energy on the line at the start of the first pulse from the D.-C. teleprinter loop, remove the carrier from the line at the end of a predetermined and adjustable time interval after the last character has been typed on the teleprinter, and mute the receiving relay during the time the local transmitter carrier is on the line.

An object of this invention is the provision of a party line keying circuit for use in an alternating current telegraph which system includes a transmitter comprising a source of marking and spacing signal frequencies, and a telegraph signal generator for controlling the said source of signal frequencies, the said party line keying circuit comprising a first normally cut-off switching device adapted to conduct in response to telegraph signals from the said telegraph signal generator, a second normally cut-off switching device, circuit means connecting the said first and second switching devices, and means controlled by the said second switching device for connecting the transmitter to a communication link during continuous generation of telegraph signals by said telegraph signal generator.

An object of this invention is the provision of an alternating current telegraph system comprising, a transmitter comprising a continuously operative source of marking and spacing signal frequencies, a buffer amplifier comprising a normally disabled amplifying device, means connecting the transmitter to a communication link through the said buffer amplifier, a party line keying circuit comprising a normally cut-off first transistor, a telegraph signal generator controlling the said source of signal frequencies and the conduction of the said first transistor, a time delay circuit responsive to the output from the said first transistor, a second normally cut-off transistor responsive to the said first transistor and said time relay circuit, means connecting the said second transistor to the said buffer amplifier amplifying device to enable the device during conduction of the said second transistor.

An object of this invention is the provision of an alternating current telegraph system comprising, a transmitter comprising a continuously operative source of marking and spacing signal frequencies, a normally disabled means connecting the transmitter to a communication link, a normally responsive signal frequency receiver connected to the communication link, a telegraph signal generator for controlling the said source of signal frequencies, a transmitter keying and receiver muting circuit comprising a first normally cut-off switching transistor responsive to the said telegraph signal generator, a time delay circuit responsive to the output from the said first transistor, second and third normally cut-off transistors responsive to the said first transistor and to the said time delay circuit, means controlled by the said second transistor for muting the receiver during continuous generation of telegraph signals by said telegraph signal generator, and means controlled by said third transistor for connecting the transmitter to the communication link during continuous generation of telegraph signals by the said telegraph signal generator.

These and other objects and advantages will become apparent from the following description when taken with the accompanying drawings illustrating the invention. It will be understood, however, that the drawings are for purposes of illustration and are not to be construed as defining the scope or limits of the invention, reference being had for the latter purposes to the claims appended hereto.

In the drawings wherein like reference characters denote like parts in the several views.

Figure 1:
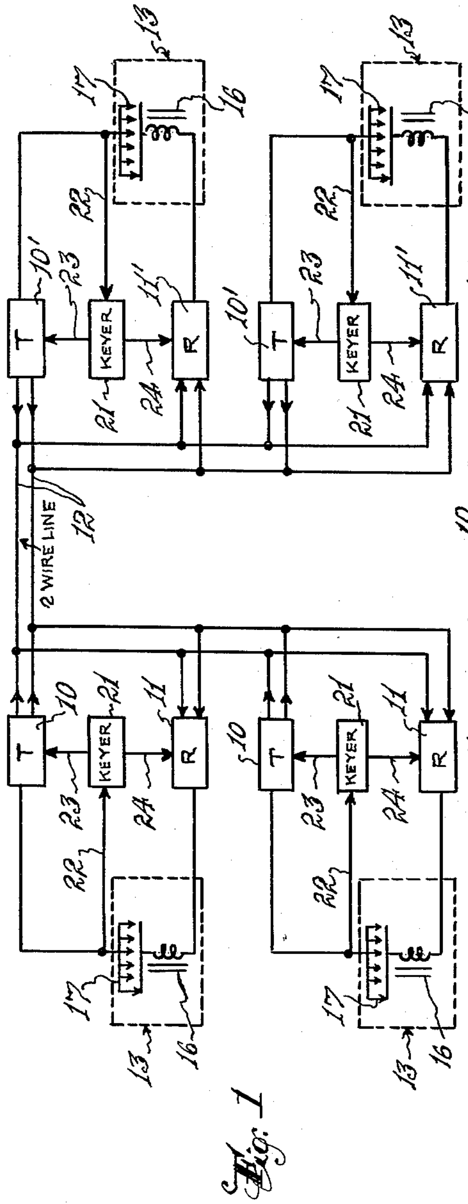
FIGURE 1 is a block diagram of a half-duplex, two wire, party line communication system employing teleprinters and our novel party line keying circuit.

Reference is first made to FIGURE 1 wherein there is shown a block diagram of a party line communication system which includes two (2) pairs of transmitters 10 and receiver terminals 11 interconnected by a two wire line 12 to two other pairs of transmitter and receiver terminals which are identical with terminals 10 and 11 but which, for sake of clarity, are designated 10′ and 11′, respectively. Although a total of four (4) stations are shown in FIGURE 1, it will be understood that our invention is not limited to party line systems employing four stations, since any number of stations may be used in the system. Each station includes a teleprinter 13 comprising a series connected printer selector magnet 16, representing a telegraph receiver recorder, and key contacts 17. The actual printers are of well-known conventional construction with the key contacts normally closed until a key is depressed, as in typing, or until such key is operated electromagnetically upon receiving transmitted intelligence. The selector magnet 16 and key contacts 17 of each station are included in a D.-C. teleprinter loop circuit which include also a series connected source of D.-C. potential. The transmitters are keyed by telegraph signal voltage pulses from the associated teleprinter loop circuit upon actuation of the teleprinter key board. The selector magnet, or recorder, is operated upon actuation of the key board 17 and also by the associated receiver output upon receipt of input signals to the receiver from remote transmitters.

The transmitters and receivers, for the two-wire party line arrangement, are all tuned to the same frequency channel, preferably in the audio range, with the Mark function being represented by a 977.5 cycle per second tone and the Space function by a 892.5 cycle per second tone, for example. It will be apparent that if during stand-by condition, all the transmitters were transmitting a Mark-Hold signal to the line 12, the transmission of a Space signal by any one of the transmitters upon actuation of a printer key on the associated teleprinter would be of no avail since such Space signal on the line would be overridden by the Mark signals from the other transmitters. Party line operation is made possible by use of our novel party line keying circuit, designated 21, at each of the stations, which circuits are energized by an output from the associated teleprinter loop circuit (as are the transmitters) through leads designated 22. The keying circuits 21 are connected to the associated transmitters through leads 23, and function to place the transmitter output carrier on the line 12 at the start of the first space pulse from the associated teleprinter loop circuit and to remove the carrier from the line a short time interval after the end of the message being typed on the teleprinter.

Since all of the transmitters and receivers are tuned to the same channel frequency, it will be apparent that each receiver is vulnerable to the output from its associated transmitter in the illustrated two-wire party line system of FIGURE 1. Because of an inherent delay between the time the message is typed at the teleprinter and received at the receiver output, the series connected transmitting and receiving contacts of the teleprinter would not operate synchronously, and the local copy would be disrupted. To prevent disruption of the local copy, the keying circuits 21 are connected through leads 24 to the associated receivers and provide a signal to a relay in the receiver output during the time the associated transmitter carrier is on the line to thereby mute the receiver.

It will be understood that with the two-wire party line system illustrated in FIGURE 1, the receiving printers are unable to "break" the sending printer since the receiver associated with the sending transmitter is muted. In a full-duplex party line system, wherein the communication link is maintained on a four-wire basis, as in a microwave system, for example, the input to the receiver and output to the transmitter of each individual station are isolated from each other. Therefore, each individual receiver is not vulnerable to its local transmitter and muting of the receiver relay is not required. It will be understood, however, that in such a full-duplex system, the novel party line keying circuit of our invention is used to key the transmitter carrier but not to mute the receiver upon transmission by its associated transmitter. With a four-wire application, the sending printer can be disrupted by any of the receiving printers at the opposite end of the communication link.

Figure 2:
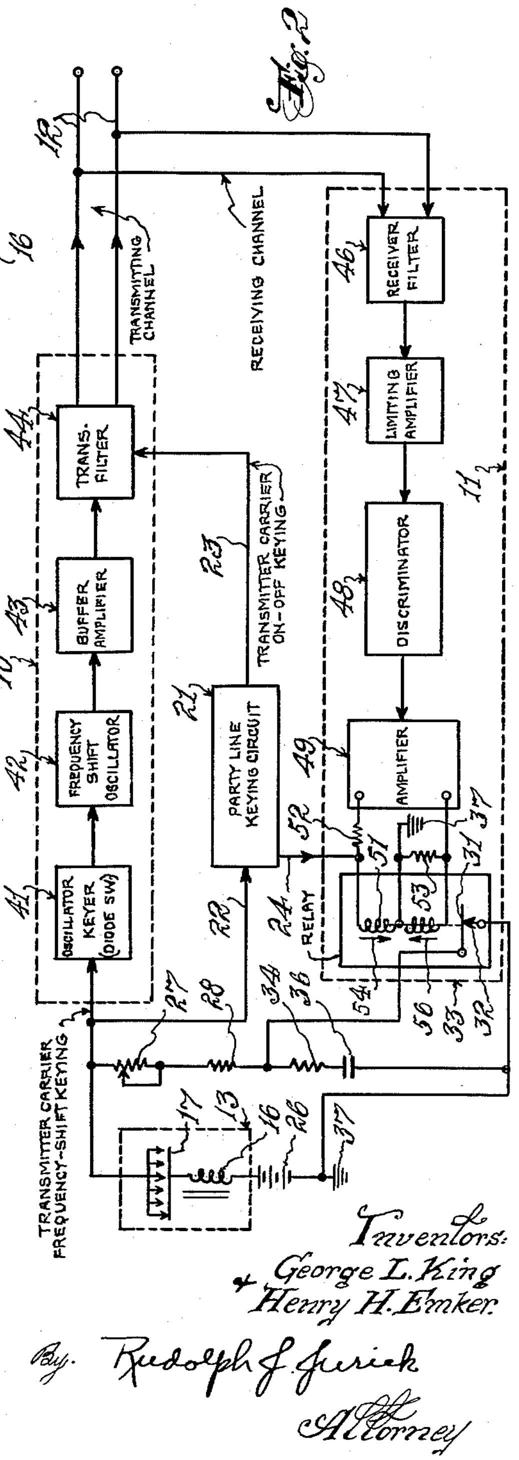
FIGURE 2 is a detailed block diagram of one of the party line stations shown in FIGURE 1.
Figure 3:
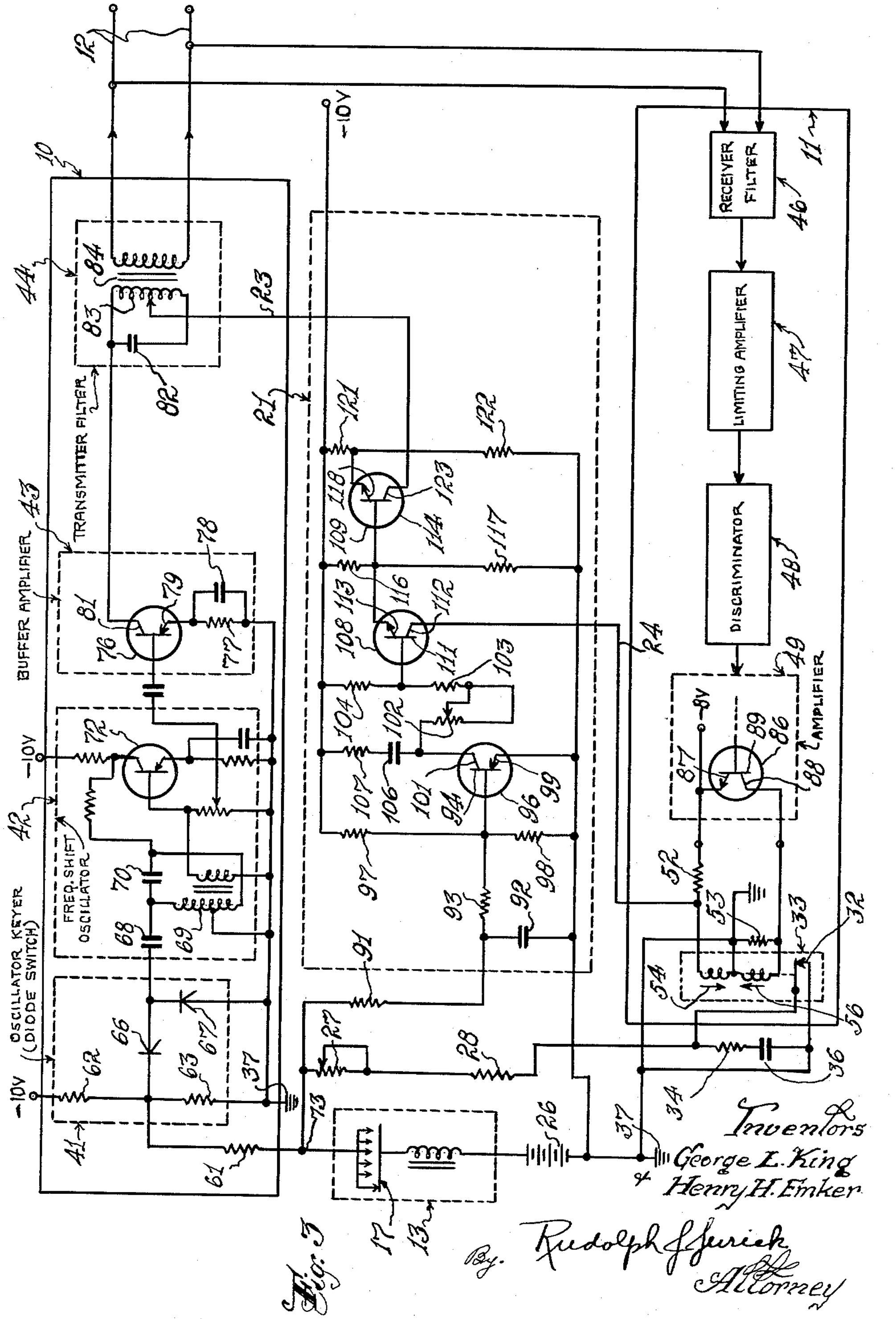
FIGURE 3 is a semi-diagrammatic illustration of the station shown in FIGURE 2.

Reference is now made to FIGURES 2 and 3 of the drawings wherein there is shown a block diagram and a semi-schematic diagram, respectively, of one of the telegraph stations shown in FIGURE 1. The printer selector magnet 16 and key contacts 17 of the teleprinter are in series circuit arrangement with a D.-C. voltage source, such as the battery 26. In addition to the teleprinter 13 and battery 26, the D.-C. teleprinter loop circuit includes a series connected potentiometer 27, current limiting resistor 28 and the contacts 31 and 32 of the receiver telegraph relay 33. A series connected resistor 34 and capacitor 36 are connected across the receiver relay contacts. The negative side of the battery 26 and the stationary relay contact 32 are connected together and to the common ground connection, designated 37. During stand-by condition the D.-C. teleprinter loop circuit is closed, i.e. the telegraph keys and the receiver relay contacts are in a closed condition.

Referring, specifically, to FIGURE 2, it will be seen that the D.-C. teleprinter loop is connected to the carrier frequency transmitter 10, which transmitter includes an oscillator keying circuit 41 (comprising a diode switch or clamping circuit, for example) connected to a frequency shift carrier oscillator 42. The output from the frequency shift oscillator comprises either a Mark signal tone of one frequency when the teleprinter key contacts 17 are closed, or a Space signal tone of a second frequency when the teleprinter key contacts 17 open the D.-C. loop circuit. The oscillator output terminals are connected through a buffer amplifier 43 and band pass filter 44 to the communication link 12.

In the half-duplex party line system illustrated in the drawings, the input for the receiver 11 is obtained from the communication link 12. As seen in FIGURE 2, the receiver, which may be of any conventional design, comprises a receiver band pass filter 46 tuned to the same carrier frequency channel as the transmitter band pass filter 44. The filtered signals from the communication link passing through the receiver band pass filter are applied to a limiting amplifier 47 which is of conventional design and utilizing, for example, three resistance-capacitance coupled stages, each operating as a limiting amplifier stage. To permit the amplifier to operate at the greatest possible telegraph transmission speed, while maintaining a minimum difference of level between marking and spacing carrier frequencies, the time constants of the R-C coupling networks are no greater than the period of the lowest carrier frequency employed. The limited signals are then applied to a tuned discriminator 48 of conventional design which converts the Mark signals to positive D.-C. voltages and the Space signals to negative D.-C. voltages. These D.-C. signals are passed through an amplifier 49, comprising several stages of amplification, if desired. The resulting square wave output from the amplifier 49 is connected to the ends of a center-tapped relay control winding 51 of the receiver telegraph relay 33, the center tap of which winding is connected to the common ground potential 37. One amplifier output terminal is connected through a resistor 52 to one end of the control winding 51, while the other amplifier output terminal is connected directly to the other end of the control winding, and to the common ground connection through a resistor 53. With a Mark signal input to the receiver, a receiver output current flows through the resistor 52 and upper portion of the relay control winding to ground. The direction of the current flow from the receiver through the upper portion of the control winding (and as indicated by the arrow 54) is such as to maintain the relay contacts in the closed condition. With a Space signal input to the receiver, receiver output currents flow through both halves of the relay control winding in opposed directions, as indicated by the arrows 54 and 56. The current flow in the lower portion of the winding, and indicated by the arrow 56 is, however, greater than the current flow in the upper portion thereof whereby the relay contacts 31, 32 are opened with a Space signal input to the receiver. The discriminator circuit 48 is adjusted such that when no signal is applied to the receiver input, the discriminator produces a positive voltage (Mark function) whereby the amplifier output to the relay 33 maintains the relay contacts in a closed condition.

The novel party line keying circuit 21 of our invention is connected through the lead 22 to the D.-C. teleprinter loop and is provided, therefore, with the same input pulses which are supplied to the input of the transmitter 10. The output lead 23 from the party line keying circuit 21 is connected to the transmitter band pass filter 44 and, as described in detail below with reference to FIGURE 3, serves to place the carrier frequency signal from the frequency shift oscillator 42 on the communication line 12 at the initiation of a message at the teleprinter 13 and to remove the same from the line a short interval of time after operation of the teleprinter key board. The second keying circuit output lead 24 is connected to the upper end of the relay control winding 51 and provides a sufficiently large current through the control winding in the direction of the arrow 54 to maintain the relay contacts in a closed position (Mark condition) whether the receiver input signal is a Mark or a Space function during the time the associated transmitter is sending, to thereby mute the receiver. The receiver muting signal is removed from the receiver relay during periods of no transmission from the associated transmitter whereby the receiver relay is in condition to respond to receiver input signals from other stations in the party line arrangement at all times that its associated transmitter is not transmitting.

Reference is now made to FIGURE 3 of the drawings wherein the party line keying circuit 21 and portions of the respective transmitter and receiver terminals 10 and 11 of a teleprinter station are shown schematically. The D.-C. teleprinter loop is shown connected through a coupling resistor 61 to the input of the oscillator keyer 41, which keyer circuit includes a pair of series connected resistors 62 and 63 forming a voltage divider network between a negative 10 volt supply and the common ground 37. Series and shunt connected keying diodes 66 and 67, respectively, are connected between the junction between the resistors 62 and 63 and the common ground 37. The junction between the diodes is connected through a capacitor 68 to a tuned oscillator circuit which includes an inductor 69 and capacitor 70. The tuned oscillator circuit is included in a feedback oscillating type circuit which includes a transistor 72. With the printer key board contacts 17 closed, the positive D.-C. voltage of the D.-C. source 26, minus the relatively small drop across the selector magnet 16, is applied to the point designated 73 in the D.-C. printer loop. For purposes of description, the D.-C. source 26 may be a 120 volt battery, for example. The positive voltage from the D.-C. teleprinter loop is applied through the coupling resistor 61 to the keying diodes 66 and 67, and the diodes are thereby reverse biased to a non-conducting state. With the diodes non-conducting, the capacitor 68 is effectively removed from the oscillator circuit, and the oscillator generates a Mark signal. When the printer keyboard contacts 17 are opened, during a sending operation, the positive potential of the battery 26 is removed from the input to the oscillator keyer, and the negative 10 volt potential through the voltage divider network of resistors 62 and 63 provides a negative, forward, bias on the keying diodes 66 and 67, causing the diodes to conduct. The capacitor 68 is thus clamped to ground potential through the diode 67 thereby shifting the frequency of the tuned oscillator circuit to a Space frequency signal.

It will here be noted that in choosing the value of the D.-C. coupling resistor 61, two factors must be considered. First, negative inductive voltage transients from the selector magnet 16, when the D.-C. teleprinter loop is keyed by the relay 33, must not lower the positive reverse bias on the oscillator keyer diodes to a point where the transmitter can shift momentarily to a Space frequency. Secondly, the selector magnet, when the relay contacts are open (Space condition) must have a value of current as near zero as possible. A low value of resistance for the resistor 61 will satisfy the first requirement, and a high value is required in the second case. Consequently, a compromise in resistance values must be made. For a 120 volt D.-C. supply 26, a coupling resistor value of between 56K to 100K ohms has been found to be satisfactory.

The Mark and Space signals from the frequency shift oscillator 42 are applied to the input of the buffer amplifier 43 comprising a transistor 76 illustrated as a PNP type. A shunt connected resistor 77 and capacitor 78 are connected between the emitter electrode 79 of the transistor and ground to provide a reverse emitter bias for the buffer amplifier base-driven transistor. The output of the buffer amplifier from the collector electrode 81 is connected to the transmitter band-pass filter 44 which includes a shunt connected capacitor 82 and tapped primary winding 83 of a coupling transformer 84. The tap on the transformer primary winding is connected to the lead 23 from our novel party line keying circuit 21, described in detail below. For purposes of description of the transmitter operation, it will here be pointed out that during operation of the teleprinter key board contacts, a negative supply potential is applied to the collector electrode 81 through the transformer primary winding 83 and the lead wire 23 from the party line keying circuit 21 whereby the oscillator output is fed through the buffer amplifier and band-pass filter to the line 12. During Mark-Hold, or stand-by condition of the teleprinter, the party line keying circuit 21 effectively open circuits the connection from the negative supply potential to the lead wire 23 whereby the said negative supply is removed from the collector 81 thereby preventing the frequency shift oscillator Mark signal from reaching the band-pass filter 44 and line 12.

In FIGURE 3, the receiver band-pass filter 46, limiting amplifier 47 and discriminator 48 are shown in block diagram form and may be of well known design and construction. Although the output stage of the amplifier 49 is schematically illustrated in FIGURE 3 for purposes of detailed description of the receiver relay 33 operation, it will be understood that the amplifier 49 may also be of well known design and construction. The final amplifier stage is shown comprising a base driven NPN type transistor 86 in which the emitter electrode 87 thereof is connected to a suitable 8 volt negative bias supply. The 8 volt negative supply is also connected through the resistor 52 to one end of the relay control winding 51 while the collector 88 is connected to the other end of the relay control winding. With no signal input to the receiver, i.e. when none of the transmitters in the party line system are transmitting, the discriminator output is such that a negative voltage is applied to the base 89 of the transistor 86 to thereby maintain the transistor cut-off. With the transistor 86 cut-off, no current flows in the lower portion of the relay control winding 51, while a small current flows from the negative 8 volt supply through the resistor 52 and the upper portion of the control winding 51 in the direction of the arrow 54 to maintain the relay contacts in the closed position (Mark condition) as viewed in FIGURE 3. With a Mark signal input to the receiver, from any transmitter other than the adjacent transmitter, the discriminator output signal serves to drive the transistor 86 further into the cut-off region, and the relay contacts are closed by current flow through the upper portion of the relay control winding in the same manner, as described above, with no receiver input signal. With a Space signal input to the receiver, from any transmitter other than the adjacent transmitter, the discriminator output serves to drive the transistor 86 to a fully conducting state whereby substantially the entire 8 volt source of potential on the emitter 87 is switched to the collector 88 and applied to the lower portion of the relay control winding 51 in the direction of the arrow 56. The current flow through the upper portion of the relay control winding is limited by the resistor 52 and is consequently much less than the current flow through the transistor 86 and lower portion of the winding. Hence, the current flow in the winding in the direction of the arrow 56 predominates and thereby opens the relay contacts 31, 32 (Space condition). The current flow through the D.-C. teleprinter loop is thereby broken; the receiving printer responding to the message being typed on the remote sending printer. During actuation of the keyboard of the associated printer, the party line keying circuit functions to place a negative potential on the line 24 connected to the upper end of the relay control winding, which potential is greater than the negative potential applied to the lower end of the winding. As a result, the current flow in the upper portion of the winding in the direction of the arrow 54 dominates in the winding, whereby the relay contacts are maintained closed (Mark condition) regardless of the nature of the signal at the receiver input.

Our novel party line keying circuit 21, as viewed in FIGURE 3, is provided with an input from the teleprinter D.-C. loop circuit through a coupling resistor 91; the input being derived from the junction 73 from which junction the transmitter input signal potential is also obtained. A filter capacitor 92 is connected in shunt at the input to the keying circuit between the resistor 91 and the common ground connection. A resistor 93 connects the junction between the resistor 91 and capacitor 92 to the base electrode 94 of a transistor 96, which transistor operates in the switching mode. The base electrode 94 is also connected to the junction between a pair of series connected voltage dividing resistors 97 and 98, which series connected resistors are connected between a negative 10 volt supply and the common ground connection.

The emitter 99 of the transistor 96 is connected directly to the common ground connection, and the collector 101 thereof is connected to the negative 10 volt supply through a series connected potentiometer 102 and resistors 103 and 104. A series connected energy storage device, comprising a capacitor 106, and resistor 107 are also connected between the collector 101 and the negative 10 volt supply, and comprise elements of an RC time delay circuit, the purpose of which is described in detail hereinbelow.

The transistor 96 acts as a controlling switch between the D.-C. teleprinter loop circuit and a pair of transistors 108 and 109 which also operate in the switching mode. Input signals to the base 111 of the base driven transistor 108 are provide by the connection between the base 111 and the collector 101 of the transistor 96 through the potentiometer 102 and resistor 103. The collector 112 of the transistor 108 is connected through the receiver muting lead 24 to the receiver relay control winding 51, while the emitter 113 thereof is directly connected to the base 114 of the second switching transistor 109. The connected emitter 113 and base 114 are also connected to the junction between series connected resistors 116 and 117 which, in turn, are connected between the negative 10 volt supply potential and ground potential to form a voltage dividing network therebetween. The emitter 118 of the transistor 109 is connected to the junction between another voltage dividing network comprising series connected resistors 121 and 122 also connected between the negative 10 volt supply and the common ground connection. The collector 123 of the transistor 109 is connected to the tap on the primary transformer winding 83 of the transmitter band pass filter through the transmitter carrier keying lead 23.

In operation of our novel party line keying circuit 21, the switching transistors 108 and 109 act together as what may be described as a double-pole single-throw switch; i.e. both transistors are simultaneously either in a current saturation condition or current cut-off condition, and are simultaneously switched to the same switching condition. The term "saturation" is intended to mean that condition wherein a further increase in the magnitude of the forward bias potential between the base and emitter electrodes of the individual transistors has a negligible effect upon the magnitude of the current flowing between the emitter and collector electrodes and, conversely the term "cut-off" is intended to mean that condition wherein a further increase in the magnitude of the reverse bias potential between the base and emitter electrodes of the individual transistors is ineffective to further decrease the current flow between the emitter and collector electrodes. With the "controlling switch" transistor 96 cut off, the base 111 of the transistor assumes the negative 10 volt potential connected thereto through the resistor 104, while the emitter 113 is maintained at a smaller negative potential through action of the voltage divider network of the resistors 116 and 117. The resulting base to emitter potential provides a reverse bias to cut-off the transistor 108.

The relative resistance ratio between the voltage divider network of resistors 121 and 122 and the network of resistors 116 and 117 is such that a reverse bias potential is provided between the base 114 and emitter 118 to cut-off the transistor 109 when the transistor 108 is cut off. When the transistor 108 is switched "on" to saturation condition, in a manner described in detail below, the transistor 109 is simultaneously switched to the "on" condition since the transistor 109 is controlled by emitter-follower action of the transistor 108. When the transistor 108 conducts, the collector current thereof flows through the upper portion of the relay control winding 51 in the direction of the arrow 54 to hold the relay in the Mark condition (relay contacts closed). It will be understood that the carrier receiver 11 is responsive at all times to signals from all the transmitters in the system but under current conducting condition of the transistor 108, the transistor collector current flowing through the upper portion of the relay control winding maintains the relay contacts closed regardless of the output from the receiver amplifier 49. Also, when the transistor 109 conducts (simultaneously with the conduction of the transistor 108) the transmitter buffer amplifier collector electrode 81 is connected to the negative 10 volt supply potential through the resistor 121, transistor 109, and primary winding 83 of the transmitter band-pass filter 44 whereupon the carrier signal from the frequency shift oscillator 42 is applied to the line through the buffer amplifier 43 and filter 44.

As mentioned above, the transistor 96 functions as a controlling switch between the teleprinter D.-C. loop and the "double-pole single-throw" switch functioning transistors 108 and 109, described above. With the teleprinter contacts 17 closed (Mark condition) a positive potential from the source 26 is applied to the base 94 of the transistor 96 through the resistors 91 and 93. In addition, a negative potential from the negative 10 volt supply source is applied to the base 94 through the resistor 97. The resultant voltage on the base 94, with the teleprinter contacts closed, is a positive potential which provides a reverse bias on the transistor 96 to cut-off the emitter-collector current. The transistor 96 is keyed on to collector-current saturation when the teleprinter contacts are opened and the positive potential from the battery 26 removed from the base electrode 94. The negative 10 volt supply to the base electrode 94 through the resistor 97 provides forward bias for saturation of the transistor 96. For purposes of description, the input circuit for keying the transistor 96 may be considered as including a bridge comprising the loop battery 26 and series connected selector magnet 16 as one leg thereof, with the remaining three legs thereof comprising the respective resistors 93 and 97 and the negative 10 volt supply. The resistor 98 comprises a center arm of the bridge; the voltage drop across resistor 98 acting as the base-emitter supply for the transistor 96. With the teleprinter contacts 17 closed to form the above-described bridge arrangement, the voltage drop across the resistor 98 is a fraction of a volt positive (base 94 positive with respect to the grounded emitter 99) to cut off the transistor 96. Upon opening the printer contacts, one leg of the bridge circuit is effectively opened and the drop across resistor 98 reverses polarity (base 94 is negative with respect to the emitter) and the transistor conducts.

It will be apparent, then, that from the above description, the switching action of transistor 96 follows the voltage pulses from the teleprinter which are produced during key-board operation. Since it is necessary, however, to provide a continuous muting signal (current) to the relay 33 and a continuous keying signal to the transmitter buffer amplifier from the transistors 108 and 109, respectively, during continuous key board operation, the transistors 108 and 109 must not respond to the switching action of the transistor 96 except at the initiation and termination of the key board operation. To this end the capacitor 106 is included in the coupling circuit between the transistors 96 and 108. It will be noted, then, that during stand-by conditions, with the transistor 96 cut-off, the capacitor 106 is in a discharged condition; connection being made from one end thereof to the negative 10 volt supply through the resistor 107 and to the same supply potential through the series connected potentiometer 102 and resistors 103 and 104. Upon keying of the transistor 96 to collector current saturation, the capacitor 106 charges rapidly through the relatively small resistor 107 and the said transistor 96. Subsequently, when the transistor 96 is keyed to collector current cut off the capacitor discharges through the resistors 107, 103, 104 and the potentiometer 102;

the voltage on the base 111 being sufficient to maintain a forward bias on the transistor 108 until the capacitor 106 is sufficiently discharged. In the illustrated circuit, the rate of discharge of the capacitor 106 is adjustable by means of the potentiometer 102. Thus, transistors 108 and 109 are maintained in a current conducting, "switch-closed" state during continuous key board operation and for a short time interval thereafter. The discharge time is made sufficiently long (up to about 1 second, maximum, e.g.) to prevent switching of the transistors 108 and 109 to a cut off condition during the transmission of a message.

As mentioned above, the receiver muting function is unnecessary in a party line arrangement wherein the communication link is maintained on a four-wire basis, as in a microwave system, since the receiver input and transmitter output of each of the stations are isolated from each other. The party line keying circuit 21 may still be used, however, to key the transmitter carrier frequency, and if the receiver muting circuitry is retained therein, a resistor is connected between the lead wire 24 and the common ground potential to maintain a load on the switching transistor 108; the lead wire 24 having been removed from the receiver relay control winding.

Having now described our invention in detail, in accordance with the requirements of the patent statutes, various other changes and modifications will suggest themselves to those skilled in this art. For example, it will be apparent that transmitter keying by the party line keyer is not limited to the means shown in the drawings wherein the collector potential is removed from the transmitter buffer amplifier by the keying circuit. Instead, the frequency shift oscillator 42 could be keyed by connection of the keying circuit thereto, for example, rather than to the buffer amplifier through the transmitter band-pass filter. Likewise, it will be apparent the receiver muting could be accomplished by application of a muting signal to other receiver elements than the relay 33 as illustrated. It is intended that these and other changes and modifications shall fall within the spirit and scope of the invention as recited in the following claims.

We claim:

1. A party line keying circuit for use in an alternating current telegraph system which system includes a transmitter comprising a source of marking and spacing signal frequencies, and a telegraph signal generator having first and second output signal conditions for controlling the said source of signal frequencies; the said party line keying circuit comprising a first switching device connected to the said telegraph signal generator, the said first switching device conducting in response to a first signal condition of the telegraph signal generator and being cut-off in response to a second signal condition thereof, a second switching device, circuit means including an energy storage device connecting the said first and second switching devices, the said second switching device responding to the first switching device and to the energy storage device whereby the said second switching device conducts during conduction of the first switching device and during continuous generation of telegraph signals by said telegraph signal generator, the said second switching device being cut off at all other times, and means controlled by the said second switching device for connecting the transmitter to a communication link when the second switching device is conducting and for disconnecting the said transmitter from the communication link when the said second switching device is cut off.

2. The invention as recited in claim 1 wherein the said first and second switching devices comprise transistors of opposite conductivity types.

3. The invention as recited in claim 1 wherein the said circuit means including an energy storage device connecting the said first and second switching devices comprises a shunt-connected capacitor and resistor, the said capacitor charging through the said first switching device upon conduction thereof and discharging through the said resistor.

4. In an alternating current telegraph system, a transmitter comprising a continuously operative source of marking and spacing signal frequencies, a buffer amplifier, means connecting the transmitter to a communication link through the said buffer amplifier, a party line keying circuit comprising a first transistor switching device, a telegraph signal generator, means connecting the telegraph signal generator to the said transmitter and to the said first transistor device for controlling the said source of signal frequencies and the conduction of the said first transistor switching device, respectively, a time delay circuit connected to the first transistor switching device and responsive to the output therefrom, a second transistor switching device connected to the time delay circuit and responsive to the said first transistor switching device and said time delay circuit whereby the said second switching device conducts during conduction of the first switching device and during continuous generation of telegraph signals by said telegraph signal generator, the said second switching device being cut off at all other times, means connecting the said second transistor switching device to the said buffer amplifier to disable the said buffer amplifier while the second transistor switching device is cut off and to enable the same while the second transistor switching device is conducting.

5. The invention as recited in claim 4 wherein the said time delay circuit comprises a shunt connected resistor and capacitor, the said capacitor charging through the said first transistor switching device upon conduction thereof and discharging through the said resistor, the said capacitor maintaining a sufficient charge through conduction of the said first transistor switching device during continuous generation of telegraph signals by the said telegraph signal generator to maintain the said second transistor in a state of conduction during continuous generation of telegraph signals by said telegraph signal generator.

6. A party line keying circuit for use in an alternating current telegraph system which includes a transmitter comprising a source of marking and spacing signals, a telegraph signal generator for controlling the said source of signal frequencies, and a signal frequency receiver; the said party line keying circuit comprising a first switching device connected to the said telegraph signal generator, the said first switching device conducting in response to a first signal condition of the telegraph signal generator and being cut off in response to a second signal condition thereof, a second switching device, circuit means including an energy storage device connecting the said first and second switching devices, the said second switching device responding to the first switching device and to the energy storage device whereby the said second switching device conducts during conduction of the first switching device and during continuous generation of telegraph signals by said telegraph signal generator, the said second switching device being cut off at all other times, and means connecting the said second switching device to the receiver to enable the said receiver while the second switching device is cut off and to mute the receiver while the second switching device is conducting.

7. The invention as recited in claim 6 wherein the said first and second switching devices comprise transistors of opposite conductivity types.

8. The invention as recited in claim 6 wherein the said circuit means including an energy storage device connecting the said first and second switching devices comprises a shunt-connected resistor and capacitor, the said capacitor charging through the said first switching device upon conduction thereof and discharging through the said resistor.

9. In an alternating current telegraph system, a transmitter comprising a source of marking and spacing signal frequencies, means connecting the transmitter to a communication link, a signal frequency receiver connected to the communication link, a telegraph signal generator connected to the transmitter and controlling the said source of signal frequencies, a transmitter keying and receiver muting circuit comprising a first switching transistor connected to the telegraph signal generator for controlling the conduction of the first switching transistor, a time delay circuit connected to the said first switching transistor and responsive to the output therefrom, second and third transistors connected to the time delay circuit and responsive to the output from the said first transistor and the said time delay circuit whereby the said second and third transistors conduct during conduction of the first switching device and during continuous generation of telegraph signals by said telegraph signal generator, the said second and third transistors being cut off at all other times, means connecting the said second transistor to the said receiver to enable the said receiver while the second transistor is cut off and to mute the receiver while the second transistor is conducting, and means connecting the said third transistor to the said means connecting the transmitter to a communication link to enable the said connecting means while the said third transistor is conducting and to disable the same while the third transistor is cut off.

10. The invention is recited in claim 9 wherein the said transistors each include a base, emitter and collector electrodes, the emitter electrodes of the said second transistor being directly connected to the base electrode of the third transistor for simultaneous switching action of the said second and third transistors.

11. A party line keying circuit for use in an alternating current telegraph system which includes a transmitter comprising a source of marking and spacing signal frequencies, means connecting the transmitter to a communication link, a signal frequency receiver, and a telegraph signal generator having first and second output signal conditions for controlling the said source of signal frequencies; the said keying circuit comprising a first, second and third transistor, each of which includes a base, emitter and collector electrodes, means connecting the base electrode of the first transistor to the telegraph signal generator whereby the said transistor conducts in response to a first signal condition of the telegraph signal generator and is cut off in response to a second signal condition thereof, a D.-C. potential source, a shunt connected capacitor and resistor, means connecting the said D.-C. potential source to the collector electrode of the said first transistor and to the base electrode of the said second transistor through the said shunt connected capacitor and resistor, means directly connecting the emitter electrode of the second transistor to the base electrode of the said third transistor whereby the said second and third transistors conduct during conduction of the first switching device and during continuous generation of telegraph signals by said telegraph signal generator, the said second and third transistors being cut off at all other times, means connecting the collector electrode of the said second transistor to the said receiver to enable the said receiver while the said second transistor is cut off and to mute the receiver while the second transistor is conducting, and means connecting the collector electrode of the said third transistor to the said means connecting the transmitter to a communication link to enable the said connecting means while the said third transistor is conducting and to disable the same while the third transistor is cut off.

References Cited in the file of this patent

FOREIGN PATENTS 342,739 Germany -------------- May 20, 1920